United States Patent
Yin (10) Patent No.: US 11,288,664 B2
(45) Date of Patent: Mar. 29, 2022

(54) METHOD AND APPARATUS FOR PROCESSING TRANSACTIONS

(71) Applicant: Advanced New Technologies Co., Ltd., Grand Cayman (KY)

(72) Inventor: Jun Yin, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 494 days.

(21) Appl. No.: 14/989,768

(22) Filed: Jan. 6, 2016

(65) Prior Publication Data

US 2016/0196554 A1 Jul. 7, 2016

(30) Foreign Application Priority Data

Jan. 7, 2015 (CN) .......................... 201510007411.8

(51) Int. Cl.
*G06Q 20/38* (2012.01)
(52) U.S. Cl.
CPC ....... *G06Q 20/385* (2013.01); *G06Q 20/3827* (2013.01)
(58) Field of Classification Search
None
See application file for complete search history.

(56) References Cited

U.S. PATENT DOCUMENTS

| | | | | |
|---|---|---|---|---|
| 4,135,241 A * | 1/1979 | Stanis | ............... | G06Q 10/087 705/28 |
| 5,613,012 A * | 3/1997 | Hoffman | ............... | G06Q 20/02 382/115 |
| 5,678,046 A * | 10/1997 | Cahill | ............... | G06Q 40/02 707/829 |

(Continued)

FOREIGN PATENT DOCUMENTS

| | | |
|---|---|---|
| CN | 1851711 A | 10/2006 |
| CN | 101158955 A | 4/2008 |
| CN | 102413126 A | 4/2012 |

(Continued)

OTHER PUBLICATIONS

Jiang et al (A Mobile Micropayment Protocol Based on Chaos) (Year: 2009).*
Yingjiu et al. (A Security-Enhanced One-Time Payment Scheme for Credit Card) (Year: 2004).*
PCT Search Report and Written Opinion dated Mar. 11, 2016 for PCT Application No. PCT/US16/12389, 13 pages.

(Continued)

*Primary Examiner* — Mamon Obeid
(74) *Attorney, Agent, or Firm* — Lee & Hayes, P.C.

(57) ABSTRACT

Method and apparatus for processing a transaction are disclosed. The method includes receiving an original card number used for a request of processing a transaction; calculating a hash value corresponding to the original card number based on the original card number, and acquiring an index card number corresponding to the original card number based on the hash value corresponding to the original card number; and sending the index card number to an entity that processes the transaction to enable the entity to process the transaction based on the index card number. The present disclosure creates corresponding index card numbers for a number of original card numbers in a system respectively, which ensures a one-to-one correspondence between the index card numbers and the original card numbers in the case of high concurrency and a convenient search for an encrypted credit card number whose password is changed frequently.

14 Claims, 7 Drawing Sheets

(56) References Cited

U.S. PATENT DOCUMENTS

| | | | | |
|---|---|---|---|---|
| 5,758,146 A * | 5/1998 | Schiefer | G06F 16/20 | 707/715 |
| 5,920,900 A * | 7/1999 | Poole | H04L 12/46 | 711/216 |
| 6,032,132 A * | 2/2000 | Nelson | G06Q 30/04 | 705/34 |
| 6,154,879 A * | 11/2000 | Pare, Jr. | G06Q 20/4014 | 705/35 |
| 6,484,182 B1 * | 11/2002 | Dunphy | G06Q 10/06 | 707/999.102 |
| 6,494,367 B1 * | 12/2002 | Zacharias | G06Q 20/04 | 235/379 |
| 6,516,320 B1 * | 2/2003 | Odom | G06F 16/902 | 707/747 |
| 6,961,858 B2 * | 11/2005 | Fransdonk | G06F 21/10 | 380/281 |
| 7,020,635 B2 * | 3/2006 | Hamilton | H04L 9/3271 | 705/51 |
| 7,080,049 B2 * | 7/2006 | Truitt | G06Q 20/16 | 380/30 |
| 7,090,128 B2 * | 8/2006 | Farley | H04L 67/2823 | 235/384 |
| 7,103,576 B2 * | 9/2006 | Mann, III | G06Q 20/04 | 705/64 |
| 7,107,462 B2 * | 9/2006 | Fransdonk | G06Q 20/12 | 380/282 |
| 7,150,045 B2 * | 12/2006 | Koelle | G06F 21/552 | 726/26 |
| 7,325,059 B2 * | 1/2008 | Barach | H04L 45/00 | 709/225 |
| 7,353,541 B1 * | 4/2008 | Ishibashi | H04N 21/4532 | 726/26 |
| 7,587,502 B2 * | 9/2009 | Crawford | A63F 13/12 | 709/229 |
| 7,711,586 B2 * | 5/2010 | Aggarwal | G06Q 10/10 | 705/5 |
| 7,748,616 B2 * | 7/2010 | Wong | G06K 19/06206 | 235/380 |
| 7,801,825 B2 * | 9/2010 | Kranzley | G06Q 20/04 | 705/67 |
| 8,307,415 B2 * | 11/2012 | Khan | H04L 63/0254 | 726/11 |
| 8,386,333 B2 * | 2/2013 | Sonderegger | G06Q 30/0601 | 705/26.42 |
| 8,538,873 B1 * | 9/2013 | Castinado | G06Q 30/02 | 705/39 |
| 8,549,279 B1 * | 10/2013 | Sahasranaman | G06Q 20/382 | 713/150 |
| 8,560,455 B1 * | 10/2013 | Raman | G06F 21/10 | 705/59 |
| 8,601,553 B1 * | 12/2013 | Griffin | H04L 63/0807 | 726/5 |
| 8,812,482 B1 * | 8/2014 | Kapoor | G06F 16/273 | 707/713 |
| 8,886,937 B2 * | 11/2014 | Miller, Jr. | G09B 5/06 | 713/168 |
| 8,897,451 B1 * | 11/2014 | Salvaji | H04L 9/0894 | 380/277 |
| 9,830,377 B1 * | 11/2017 | Ray | G06F 16/215 | |
| 2001/0016833 A1 * | 8/2001 | Everling | G06Q 40/02 | 705/39 |
| 2002/0078226 A1 * | 6/2002 | Kato | H04L 45/745 | 709/236 |
| 2004/0056088 A1 * | 3/2004 | Mullins | G06Q 30/06 | 235/380 |
| 2004/0083184 A1 * | 4/2004 | Tsuei | G06Q 20/385 | 705/74 |
| 2004/0187012 A1 * | 9/2004 | Kohiyama | G06F 21/6218 | 713/193 |
| 2004/0260653 A1 * | 12/2004 | Tsuei | G06Q 20/4037 | 705/54 |
| 2005/0188005 A1 * | 8/2005 | Tune | G06Q 20/10 | 709/203 |
| 2006/0047609 A1 * | 3/2006 | Murphy | G07B 17/00024 | 705/402 |
| 2006/0249574 A1 * | 11/2006 | Brown | G06K 19/06187 | 235/380 |
| 2007/0005416 A1 * | 1/2007 | Jackson | G06Q 30/02 | 705/14.15 |
| 2007/0288472 A1 * | 12/2007 | Rivera | G06Q 20/20 | |
| 2007/0291995 A1 * | 12/2007 | Rivera | G06F 21/35 | 382/115 |
| 2008/0033960 A1 * | 2/2008 | Banks | G06F 16/242 | |
| 2008/0059620 A1 * | 3/2008 | Claise | H04L 41/0213 | 709/223 |
| 2008/0317017 A1 * | 12/2008 | Wiemann | H04L 1/0002 | 370/389 |
| 2009/0125543 A1 * | 5/2009 | Patil | G06Q 30/06 | |
| 2009/0193223 A1 * | 7/2009 | Saliba | H04L 67/1097 | 711/216 |
| 2009/0283591 A1 * | 11/2009 | Silbernagl | G06Q 20/14 | 235/382 |
| 2009/0294527 A1 * | 12/2009 | Brabson | G06Q 20/385 | 235/380 |
| 2010/0023726 A1 * | 1/2010 | Aviles | G06F 12/0813 | 711/216 |
| 2011/0196795 A1 * | 8/2011 | Pointer | G06Q 40/12 | 705/51 |
| 2011/0244794 A1 * | 10/2011 | Nakano | H02J 50/80 | 455/41.1 |
| 2011/0258078 A1 * | 10/2011 | Sonderegger | G06Q 30/06 | 705/26.42 |
| 2012/0024946 A1 * | 2/2012 | Tullis | G06Q 20/042 | 235/379 |
| 2012/0259782 A1 * | 10/2012 | Hammad | G06Q 20/382 | 705/44 |
| 2012/0317036 A1 * | 12/2012 | Bower | G06Q 20/02 | 705/75 |
| 2012/0324555 A1 * | 12/2012 | Chambers | H04L 9/0891 | 726/6 |
| 2013/0001304 A1 * | 1/2013 | Xu | G06Q 20/38215 | 235/380 |
| 2013/0086073 A1 * | 4/2013 | Lyle | G06F 16/2255 | 707/747 |
| 2013/0110658 A1 * | 5/2013 | Lyman | G06Q 20/327 | 705/18 |
| 2013/0204925 A1 * | 8/2013 | McDougall | H04L 67/2804 | 709/203 |
| 2013/0205370 A1 * | 8/2013 | Kalgi | H04W 12/10 | 726/3 |
| 2013/0281053 A1 * | 10/2013 | Ahlgren | H04M 17/00 | 455/406 |
| 2014/0052642 A1 * | 2/2014 | Spies | G07F 7/1091 | 705/71 |
| 2014/0119377 A1 * | 5/2014 | Crosta | H04L 45/7453 | 370/392 |
| 2014/0122171 A1 * | 5/2014 | Larrain | G06Q 40/12 | 705/7.29 |
| 2014/0194153 A1 * | 7/2014 | Salkintzis | H04W 4/12 | 455/466 |
| 2014/0279556 A1 * | 9/2014 | Priebatsch | G06Q 20/38215 | 705/67 |
| 2015/0032626 A1 * | 1/2015 | Dill | G06Q 20/385 | 705/44 |
| 2015/0052286 A1 * | 2/2015 | Svendsen | G06F 12/0864 | 711/3 |
| 2015/0066770 A1 | 3/2015 | Sagady et al. | | |
| 2015/0281225 A1 * | 10/2015 | Schoen | H04L 63/06 | 726/9 |
| 2015/0332291 A1 * | 11/2015 | Gillooly | G06Q 20/202 | 705/7.29 |
| 2016/0085798 A1 * | 3/2016 | Wu | G06F 16/2455 | 707/690 |
| 2016/0110808 A1 * | 4/2016 | Yu | G06Q 40/04 | 705/37 |
| 2016/0196554 A1 * | 7/2016 | Yin | G06Q 20/385 | 705/71 |

(56) References Cited

U.S. PATENT DOCUMENTS

| | | | |
|---|---|---|---|
| 2017/0091766 A1* | 3/2017 | Venugopalan | G06Q 10/083 |
| 2018/0026968 A1* | 1/2018 | Canavor | H04L 63/0823 726/6 |
| 2018/0124034 A1* | 5/2018 | Duvall | H04L 9/3236 |
| 2018/0137164 A1* | 5/2018 | Bensberg | G06F 16/2456 |
| 2018/0191503 A1* | 7/2018 | Alwar | H04L 9/0637 |
| 2018/0315027 A1* | 11/2018 | Kumar | H04L 63/062 |
| 2019/0108496 A1* | 4/2019 | Sun | G06Q 20/40 |
| 2019/0347667 A1* | 11/2019 | Zhang | G06Q 20/027 |

FOREIGN PATENT DOCUMENTS

| | | |
|---|---|---|
| CN | 103326994 A | 9/2013 |
| EP | 1028401 | 8/2000 |
| JP | 2002056332 A | 2/2002 |
| JP | 2002157421 A | 5/2002 |
| JP | 2002312707 A | 10/2002 |
| JP | 2003178185 A | 6/2003 |
| JP | 2008033641 A | 2/2008 |
| JP | 2012507767 A | 3/2012 |
| KR | 20140042522 | 4/2014 |
| WO | WO03077468 A1 | 9/2003 |

OTHER PUBLICATIONS

The Extended European Search Report dated May 14, 2018, for European Application No. 16735379.6, 5 pages.

English translation of First Chinese Office Action for Applicaiton No. 201510007411.8, a foreign counterpart of U.S. Appl. No. 14/989,768, dated Oct. 23, 2018, 6 pages.

English translation of Inital Chinese Search Report for Applicaiton No. 201510007411.8, a foreign counterpart of U.S. Appl. No. 14/989,768, dated Jan. 7, 2015, 1 page.

English machine translation of Second Chinese Office Action for Applicaiton No. 201510007411.8, a foreign counterpart of U.S. Appl. No. 14/989,768, dated Apr. 1, 2019, 8 pages.

The Japanese Office Action dated Apr. 2, 2019 for Japanese Patent Application No. 2017-533197, a counterpart of U.S. Appl. No. 14/989,768, 13 pages.

The Korean Office Action dated Jan. 28, 2020 for Korean Patent Application No. 2017-7014820, a counterpart of U.S. Appl. No. 14/989,768, 8 pages.

The Translated Korean Office Action dated Jan. 28, 2020 for Korean Patent Application No. 2017-7014820, a counterpart of U.S. Appl. No. 14/989,768, 8 pages.

The European Office Action dated Apr. 6, 2020, for European Patent Application No. 16735379.6, a counterpart foreign application of the U.S. Appl. No. 14/989,768, 4 pages.

The Indian Office Action dated Sep. 29, 2020 for Indian Patent Application No. 201717017551, a counterpart of U.S. Appl. No. 14/989,768, 9 pages.

English Translation of the Korean Office Action dated Jul. 30, 2020 for Korean Patent Application No. 2017-7014820, a counterpart of U.S. Appl. No. 14/989,768, 2 pages.

The Korean Office Action dated Jul. 30, 2020 for Korean Patent Application No. 2017-7014820, a counterpart of U.S. Appl. No. 14/989,768, 5 pages.

The Singaporean Office Action dated Oct. 1, 2020 for Singaporean Patent Application No. 10201906106P, a counterpart of U.S. Appl. No. 14/989,768, 8 pages.

The European Office Action dated Aug. 19, 2021 for European Patent Application No. 16735379.6, a foreign counterpart to U.S. Appl. No. 14/989,768, 7 pages.

CN Rejection Decision for Applicaiton No. 201510007411.8, a foreign counterpart of U.S. Appl. No. 14/989,768, dated Aug. 6, 2019, 5 pages.

English machine translation of CN Rejection Decision for Applicaiton No. 201510007411.8, a foreign counterpart of U.S. Appl. No. 14/989,768, dated Aug. 6, 2019, 10 pages.

* cited by examiner

METHOD AND APPARATUS FOR PROCESSING TRANSACTIONS

CROSS REFERENCE TO RELATED PATENT APPLICATIONS

This application claims foreign priority to Chinese Patent Application No. 201510007411.8 filed on Jan. 7, 2015, entitled "Method and Apparatus for Processing Transactions," which is hereby incorporated by reference in its entirety.

TECHNICAL FIELD

The present disclosure relates to the field of Internet technologies, and more particularly to methods and apparatuses for processing transactions.

BACKGROUND

In a payment system that supports credit card payments, there is a strict security requirement on the operations of receiving, transferring and storing users' credit card information, especially credit card numbers. According to the international practice, a payment system for processing original information, such as credit card numbers, should at least pass the authentication of Payment Card Industry (hereinafter referred to as PCI).

In a PCI authentication, a common solution is to allocate a virtual index card number to each real credit card number. In the process of processing credit card information, the original card number of the credit card is replaced with such index card number for transfer and storage. Only when the original card number of the credit card needs to be used, will the corresponding original card number be used. This is to ensure that the original card number of the credit card is used at a minimum level, and can be controlled and managed in a unified manner.

However, in existing technologies, the process of allocating a virtual index card number to a real credit card number has the following problems:

1. when a number of users use identical or different credit cards to make a payment at the same time, there is a concurrency issue with the creation of an index card number, and it is unavoidable that two different index card numbers are allocated to a same credit card in the case of concurrency;

2. According to PCI's requirement, the original card number of the credit card cannot be stored with plaintext and must be encrypted. However, due to security restrictions on algorithm and secret key, the cipher text and encryption secret key of the original card number of the credit card must be changed frequently. The existing method of encrypting the original card number of the credit card cannot change the cipher text and secret key of the credit card number flexibly, and may easily cause confusion;

3. According to business transaction requirements, a system needs to find an encrypted credit card number and a corresponding index card number quickly based on the original card number of the credit card. However, in existing technologies, the efficiency of searching an encrypted credit card number and a corresponding index card number is rather low.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to solve one or more of the above technical problems in the existing technologies.

Therefore, the first objective of the present disclosure is to provide a method for processing a transaction. The method creates corresponding index card numbers for a number of original card numbers in a system respectively, which ensures a one-to-one correspondence between the index card numbers and the original card numbers in the case of high concurrency and a convenient search for an encrypted credit card number whose password is changed frequently.

The second objective of the present disclosure is to provide an apparatus for processing a transaction.

In order to implement embodiments, the method for processing a transaction according to the embodiment of the present disclosure in the first aspect includes: receiving an original card number for requesting to process a transaction; calculating a hash value corresponding to the original card number based on the original card number, and obtaining an index card number corresponding to the original card number based on the hash value corresponding to the original card number; and sending the index card number to an entity that processes the transaction to cause the entity to process the transaction based on the index card number.

In the disclosed method according to the embodiments of the present disclosure, after receiving the original card number for requesting to process the transaction, a hash value corresponding to the original card number is calculated based on the original card number, and an index card number corresponding to the original card number is obtained based on the hash value corresponding to the original card number, thereby creating corresponding index card numbers for a number of original card numbers in the system respectively, which ensures a one-to-one correspondence between the index card numbers and the original card numbers in the case of high concurrency and a convenient search for an encrypted credit card number whose password is changed frequently.

In order to implement embodiments, the apparatus according to the embodiment of the present disclosure in the second aspect includes: a receiving module for receiving an original card number for requesting to process a transaction; a calculation module for calculating a hash value corresponding to the original card number based on the original card number received by the receiving module; an acquisition module for obtaining an index card number corresponding to the original card number based on the hash value corresponding to the original card number calculated by the calculation module; and a sending module for sending the index card number obtained by the acquisition module to an entity that processes the transaction to enable the entity to process the transaction based on the index card number.

In a service processing apparatus according to embodiments of the present disclosure, after a receiving module receives an original card number for requesting to process a transaction, a calculation module calculates a hash value corresponding to the original card number based on the original card number, an acquisition module obtains an index card number corresponding to the original card number based on the hash value corresponding to the original card number, thereby creating corresponding index card numbers for a number of original card numbers in an associated system respectively, which ensures a one-to-one correspondence between the index card numbers and the original card numbers in the case of high concurrency and a convenient search for an encrypted credit card number whose password is changed frequently.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

BRIEF DESCRIPTION OF THE DRAWINGS

To better illustrate embodiments of the present disclosure, the following is a brief introduction of the FIGS. to be used in the description of the embodiments. It is apparent that the following FIGS. only relate to some embodiments of the present disclosure. A person of ordinary skill in the art can obtain other FIGS. according to the FIGS. in the present disclosure without creative efforts.

The order indicated in the drawings is only for illustrative purposes. The modules can be executed in a different order or in parallel.

DETAILED DESCRIPTION

The embodiments of the present disclosure are specifically described as follows, and the exemplary embodiments are illustrated in the drawings, wherein the same or similar labels represent the same or similar elements or elements having the same or similar functions throughout the disclosure. The following embodiments described by the reference drawings are exemplary and are only used to explain the present disclosure and cannot be construed as limiting the present disclosure. Instead, the embodiments of the present disclosure include all the variants, modifications and equivalents within the spirit and scope of the appended claims.

Figure 1:
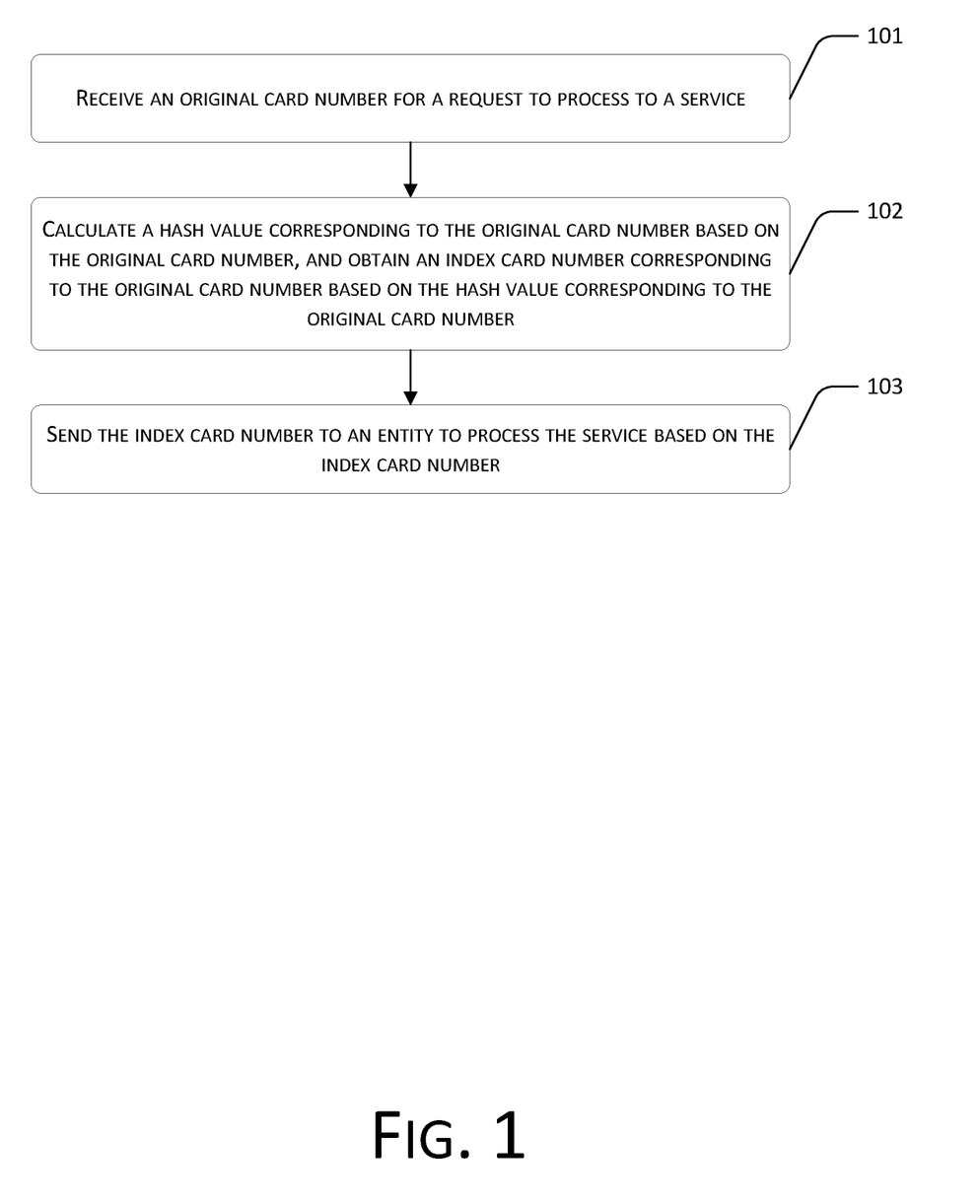
FIG. 1 is a flow chart of a method for processing a transaction according to an embodiment of the present disclosure.

FIG. 1 is a flow chart of a method for processing a transaction according to an embodiment of the present disclosure. As shown in FIG. 1, the method includes:

At block 101, an original card number used for requesting to process a transaction is received, wherein the original card number may be a credit card number.

At block 102, a hash value corresponding to the original card number is calculated based on the original card number, and an index card number corresponding to the original card number is obtained based on the hash value corresponding to the original card number.

At block 103, the index card number is sent to an entity that processes the transaction to enable the entity to process the transaction based on the index card number.

In an embodiment, after receiving the original card number used for requesting to process a transaction, a hash value corresponding to the original card number is calculated based on the original card number, and an index card number corresponding to the original card number is obtained based on the hash value corresponding to the original card number, thereby creating corresponding index card numbers for a number of original card numbers in the system respectively, which ensures a one-to-one correspondence between the index card numbers and the original card numbers in the case of high concurrency and a convenient search for an encrypted credit card number whose password is changed frequently.

Figure 2:
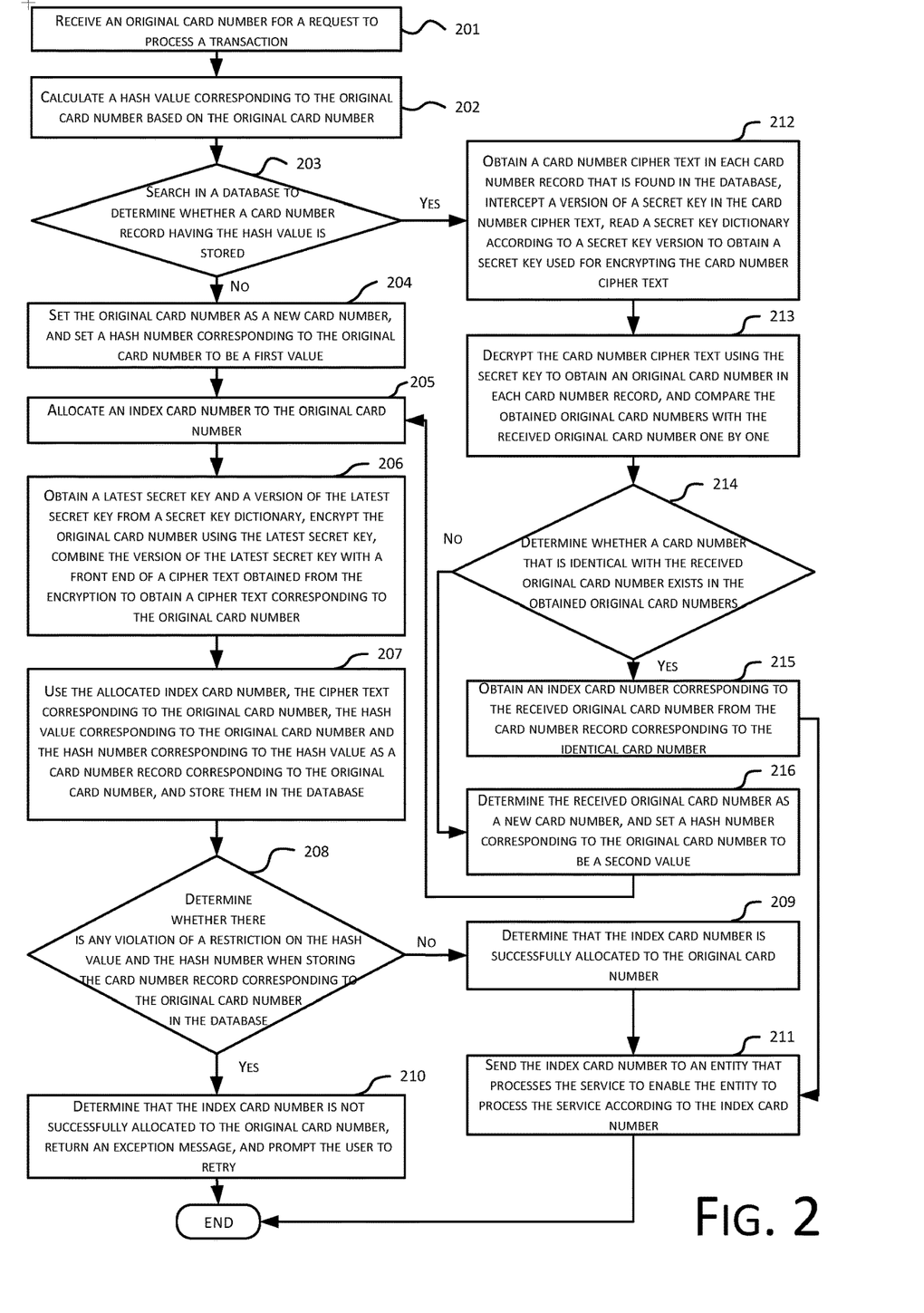
FIG. 2 is a flow chart of a method for processing a transaction according to another embodiment of the present disclosure.

FIG. 2 is a flow chart of a method of processing a transaction according to another embodiment of the present disclosure. As shown in FIG. 2, the method includes:

At block 201, an original card number for a request to process a transaction is received.

In an embodiment, the original card number may be a credit card number.

At block 202, a hash value corresponding to the original card number is calculated based on the original card number.

In an embodiment, the hash value cannot be reversely converted into the original card number, which conforms to PCI's regulation. The hash value of a card never changes. However, since a hash collision may occur, different cards may have the same hash value. Therefore, merely using a field of a hash value as a unique restriction to control the writing of a credit card in the case of concurrency may result in that, in the case of two credit cards having a same hash value, the index card number may be only allocated to one card and stored.

In the case of searching a record based on a credit card number, it is feasible to quickly search a card number record based on a hash value of a card number for search. Since there may be a hash collision, the record obtained based on the hash value may not be a desirable record. Therefore, it is necessary to make a comparison and further confirm. However, since the possibility of hash collision is rather low, such a search process still has a high efficiency. The process will be further described as follows in detail.

At block 203, the database is searched to determine whether a card number record having the hash value is stored in a database If no card number record having the hash value is found, block 204 is executed; if a card number record having the hash value is found, block 212 is executed.

At block 204, the original card number is determined as a new card number, and a hash number corresponding to the original card number is set to be a first value. A hash number is used to distinguish one card from another. As an example, when two cards having different original card numbers have the same hash value, as in the case of concurrency, each is given a different hash number.

In the embodiment, the first value may be set based on system performance and implementation requirements. The present embodiment does not impose any limitation on the size of the first value. For example, the first value may be 1.

In an embodiment, among all the stored card number records, if there is no hash collision record, the hash number is 1. In the case of a hash collision, the hash number will increase progressively. Simply speaking, when there is a hash value collision between two credit card numbers, two pieces of card number records will have a same hash value. One hash number is 1, while the other is 2. More hash collisions can be numbered in the same manner. For example, as shown in Table 1, in the case of a hash value collision, two credit cards having different card numbers (e.g., index card numbers 10000001 and 10000002) have the same hash value. In Table 1, a different hash number, starting with the number 1 and increasing sequentially, is given to each card.

In an embodiment, the hash value and the hash number corresponding to the credit card number may be combined as a unique restriction to prevent index card numbers from being allocated repeatedly to the same credit card in the case of concurrency.

At block 205, an index card number is allocated to the original card number.

At block 206, a latest secret key and a version of the latest secret key are obtained from a secret key dictionary, the original card number is encrypted using the latest secret key, and the version of the latest secret key is combined with a front end of a cipher text obtained from the encryption to obtain a cipher text corresponding to the original card number.

At block 207, the allocated index card number, the cipher text corresponding to the original card number, the hash value corresponding to the original card number and the hash number corresponding to the hash value are used as a card number record corresponding to the original card number, and stored in the database.

In an embodiment, a format of the card number record is as shown in Table 1.

is executed; if there is a violation of the unique restriction on the hash value and the hash number when storing the card number record corresponding to the original card number in the database, block 210 is executed.

At block 209, it is determined that the index card number is successfully allocated to the original card number, and block 211 is executed.

At block 210, it is determined that the index card number is not successfully allocated to the original card number, and an Exception message is returned, and the user is prompted to retry. The process is ended.

At block 211, the index card number is sent to an entity that processes the transaction to enable the entity to process the transaction based on the index card number. The process is ended.

At block 212, from each card number that is found, a card number cipher text is obtained, a version of a secret key in the card number cipher text is intercepted, and the secret key dictionary is read based on the version of the secret key to obtain a secret key used for encrypting the card number cipher text.

At block 213, the card number cipher text is decrypted by using the secret key to obtain an original card number from each card number record, and the obtained original card numbers are compared with the received original card number one by one.

At block 214, it is determined from among the obtained original card numbers whether there exists a card number that is identical with the received original card number. If yes, block 215 is executed; if it is determined that among the obtained original card numbers, there exists no card number that is identical with the received original card number, block 216 is executed.

At block 215, an index card number corresponding to the received original card number is obtained from the card

TABLE 1

| Index Card number | Cipher Text Corresponding To Original Card number | Hash Value Corresponding To Original Card number | Hash number |
|---|---|---|---|
| 10000001 | 201410_afseqf1341S&%88fyFYVvy^RA^%ER^cvvIUR&R | 6db06c4055368485 | 1 |
| 10000002 | 201409_afseqfadfadsf1S41S&%88fyFYVvy^RA^22SSds | 6db06c4055368485 | 2 |
| 10000003 | 201410_1Sefwf(&&adsf1341S&%86fyFYVvy^RA^24inuu | 5b8bfbSba45faf78 | 1 |
| ... | ... | ... | ... |

In an embodiment, the system may sequentially assign numbers to credit cards that are written into the system as index card numbers for each credit card. In the case of external transfer and storage of index card number, the original card number of the credit card cannot be recovered based on the index card number, which conforms to PCI's standard.

The cipher text corresponding to the original card number includes a cipher text generated after encrypting a credit card number based on a symmetric encryption algorithm, and a version of a secret key combined with a front end of the generated cipher text. In this way, a corresponding secret key can be found in the secret key dictionary based on the version of the secret key, and thus, the cipher text corresponding to the original card number can be decrypted.

At block 208, it is determined whether there is a violation of the unique restriction on the hash value and the hash number when storing the card number record corresponding to the original card number in the database. If not, block 209 number record corresponding to the identical card number. Subsequently, block 211 is executed.

At block 216, the received original card number is determined as a new card number, a hash number corresponding to the original card number is set to be a second value, wherein the second value is a sum of a maximum value of the hash number of the card number record that is found and a preset value.

In an embodiment, the preset value may be set based on system performance and implementation requirements. The present embodiment does not impose any limitation on size of the preset value. For example, the preset value may be 1.

Subsequently, blocks 205~211 are executed.

The embodiment creates corresponding index card numbers for a number of original card numbers in a system respectively, which ensures a one-to-one correspondence between the index card numbers and the original card numbers in the case of high concurrency and a convenient search for an encrypted credit card number whose password is changed frequently.

Figure 3:
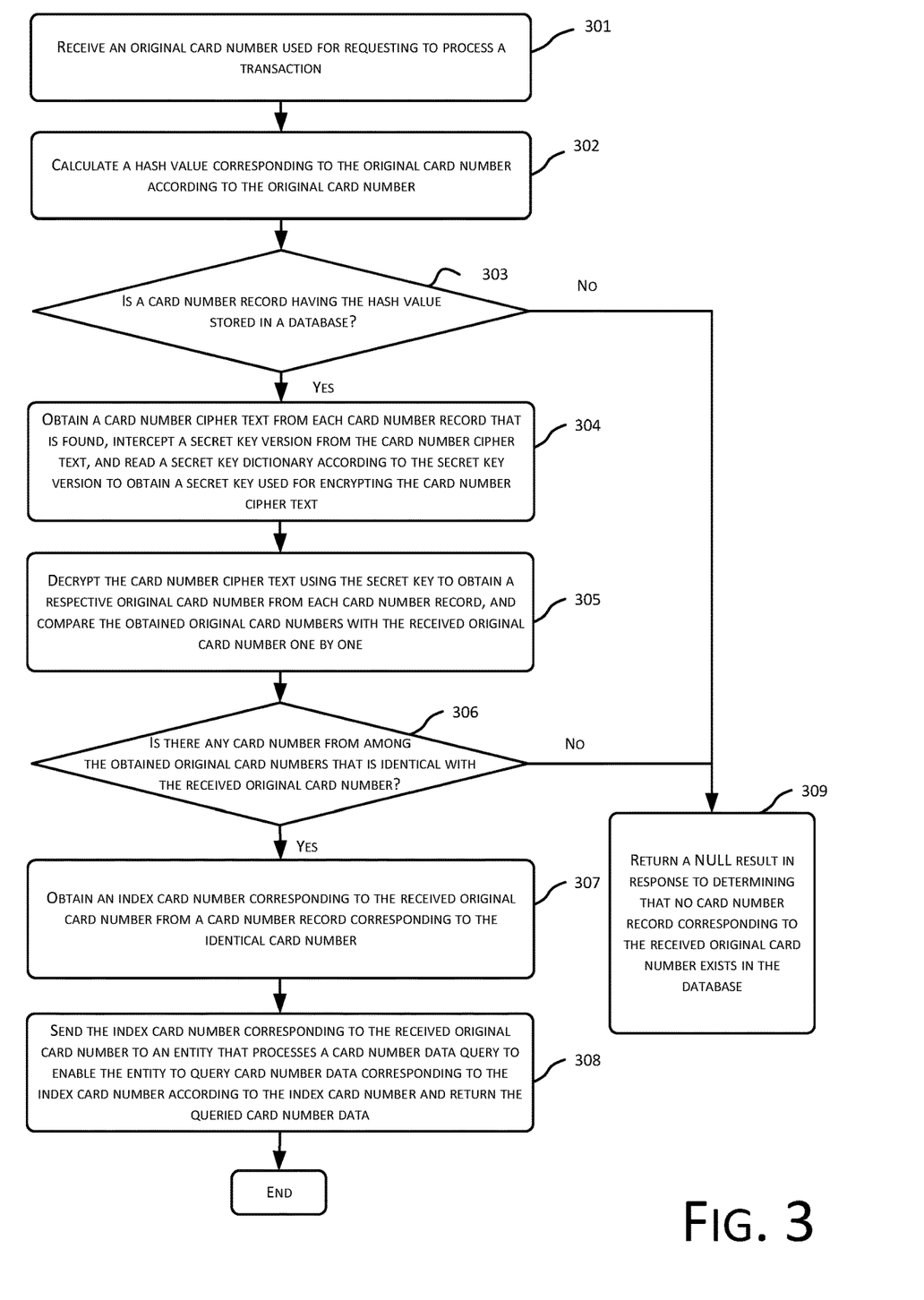
FIG. 3 is a flow chart of a method for processing a transaction according to still another embodiment of the present disclosure.

FIG. 3 is a flow chart of a method for processing a transaction according to still another embodiment of the present disclosure. In an embodiment, when the request to be processed is a card number data query transaction, as shown in FIG. 3, the method includes:

At block 301, an original card number for a request to process a transaction is received.

In an embodiment, the original card number may be a credit card number.

At block 302, a hash value corresponding to the original card number is calculated based on the original card number.

At block 303, whether a card number record having the hash value is stored in the database is searched. If a card number record having the hash value is found, block 304 is executed; if no card number record having the hash value is found, block 309 is executed.

At block 304, from each card number record that is found, a card number cipher text is obtained, a version of a secret key in the card number cipher text is intercepted, and a secret key dictionary is read based on the version of the secret key to obtain a secret key used for encrypting the card number cipher text.

At block 305, the card number cipher text is decrypted using the secret key to obtain an original card number from each card number record, and the obtained original card numbers are compared with the received original card number one by one.

At block 306, it is determined from among the obtained original card numbers whether there exists a card number that is identical with the received original card number. If yes, block 307 is executed; if it is determined that among the obtained original card numbers, there exists no card number that is identical with the received original card number, block 309 is executed.

At block 307, an index card number corresponding to the received original card number is obtained from the card number record corresponding to the identical card number.

At block 308, the index card number corresponding to the received original card number is sent to an entity that processes the card number data query service to enable the entity to query the card number data corresponding to the index card number based on the index card number, and return the queried card number data. The process is ended.

At block 309, it is determined that in the database there exists no card number record that corresponds to the received original card number, and a NULL result is returned. The process is ended.

The embodiments ensure a one-to-one correspondence between the index card numbers and the original card numbers in case of high concurrency and a convenient search for an encrypted credit card number whose password is changed frequently, which improves the search efficiency.

Figure 4:
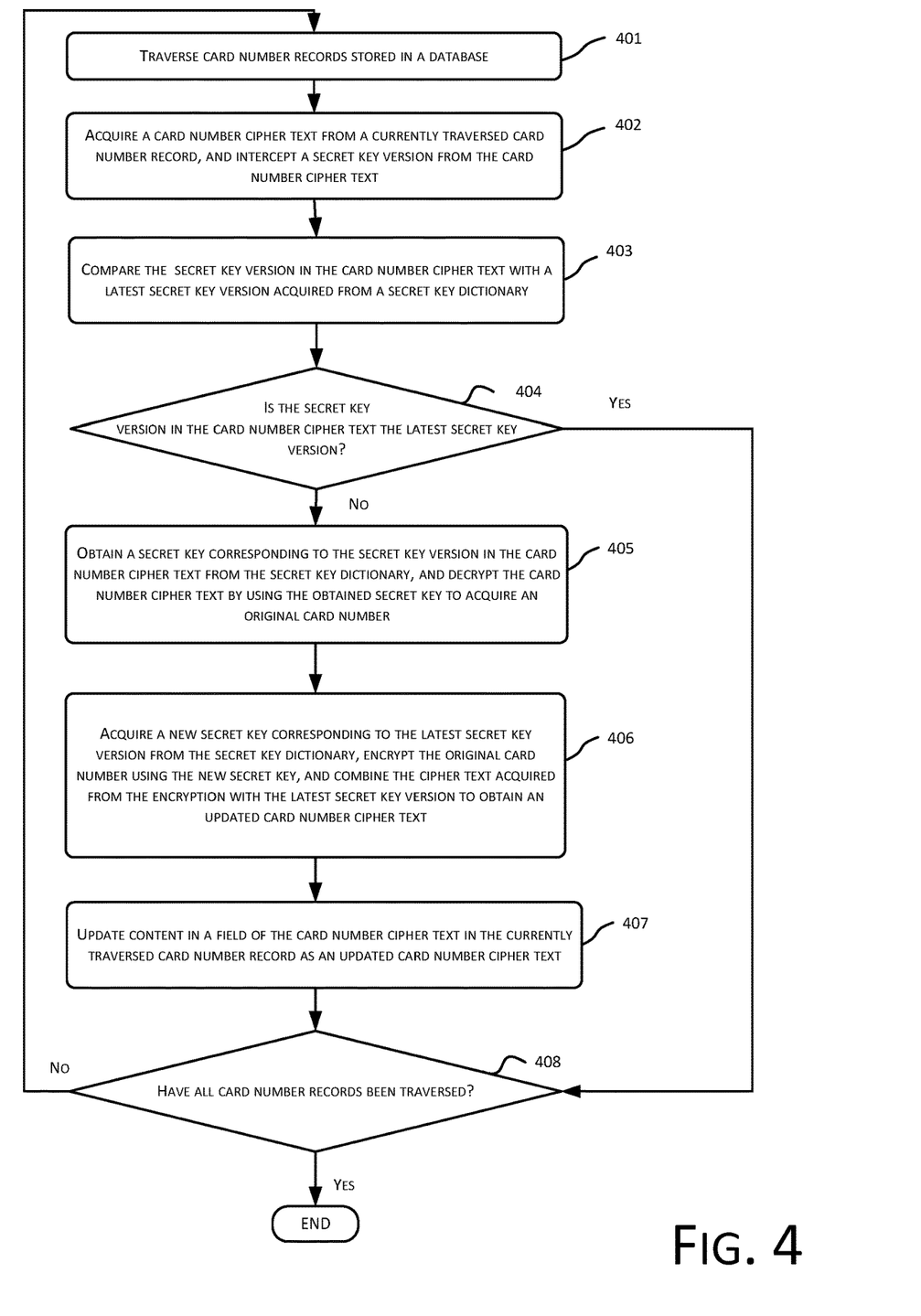
FIG. 4 is a flow chart of updating a cipher text and a secret key according to an embodiment of the present disclosure.

In the embodiments shown in FIG. 2 and FIG. 3, cipher texts and encryption secret keys in the card number records corresponding to the original card numbers need to be updated frequently. The process of updating the cipher texts and encryption secret keys is as shown in FIG. 4. FIG. 4 is a flow chart of updating a cipher text and a secret key according to an embodiment of the present disclosure. The process of updating the cipher text and the secret key may include:

At block 401, card number records stored in the database are traversed.

At block 402, a card number cipher text in a currently traversed card number record is obtained, and a version of a secret key in the card number cipher text is intercepted.

At block 403, the version of the secret key in the card number cipher text is compared with the latest version of the secret key obtained from a secret key dictionary.

At block 404, it is determined whether the version of the secret key in the card number cipher text is the latest version of the secret key.

If not, block 405 is executed; if the version of the secret key in the card number cipher text is the latest version of the secret key, block 408 is executed.

At block 405, a secret key corresponding to the version of the secret key in the card number cipher text is obtained from the secret key dictionary, and using the obtained secret key, the card number cipher text is decrypted to obtain the original card number.

At block 406, a new secret key corresponding to the latest version of the secret key is obtained from the secret key dictionary, the original card number is encrypted by using the new secret key, and the cipher text obtained from the encryption is combined with the latest version of the secret key to obtain an updated card number cipher text.

At block 407, the content in a field of the card number cipher text in the currently traversed card number record is updated to be the updated card number cipher text.

At block 408, it is determined whether all the card number records are traversed. If not, block 401 is executed; if all the card number records are traversed, the process is ended.

The foregoing embodiments allow cipher texts and secret keys in card number records to be altered flexibly without causing confusions.

Figure 5:
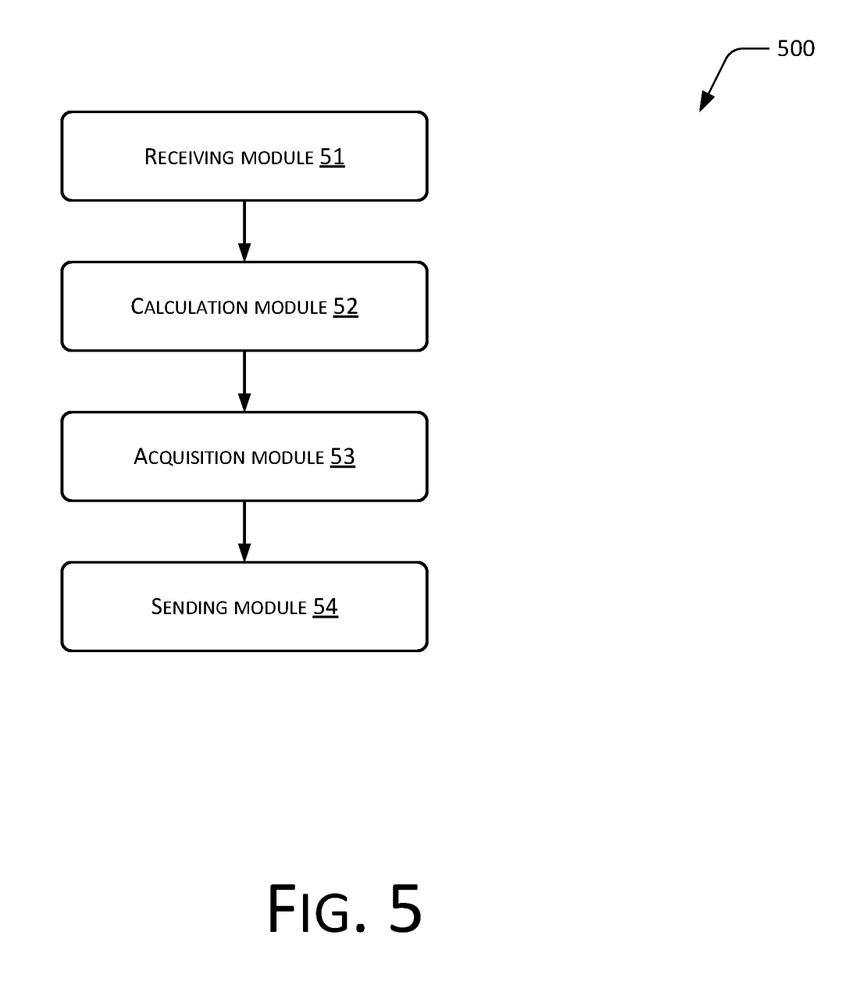
FIG. 5 is a structural schematic diagram of a service processing apparatus according to an embodiment of the present disclosure.

FIG. 5 is a structural schematic diagram of an apparatus 500 for processing a transaction in accordance with an embodiment of the present disclosure. The apparatus in this embodiment can implement the process of the embodiment shown in FIG. 1 of the present disclosure. As shown in FIG. 5, the apparatus 500 may include: a receiving module 51, a calculation module 52, an acquisition module 53, and a sending module 54.

The receiving module 51 is used for receiving an original card number used for requesting to process a transaction, in which the original card number may be a credit card number.

The calculation module 52 is used for calculating a hash value corresponding to the original card number based on the original card number received by the receiving module 51.

The acquisition module 53 is used for obtaining an index card number corresponding to the original card number based on the hash value corresponding to the original card number calculated by the calculation module 52.

The sending module 54 is used for sending the index card number obtained by the acquisition module 53 to an entity that processes the transaction to enable the entity to process the transaction based on the index card number.

In an embodiment, after the receiving module 51 receives an original card number for requesting to process a transaction, the calculation module 52 calculates a hash value corresponding to the original card number based on the original card number. Subsequently, the acquisition module 53 obtains an index card number corresponding to the original card number based on the hash value corresponding to the original card number, thereby creating corresponding index card numbers for a number of original card numbers in a system respectively, which ensures a one-to-one correspondence between the index card numbers and the original card numbers in the case of high concurrency and a convenient search for an encrypted credit card number whose password is changed frequently.

Figure 6:
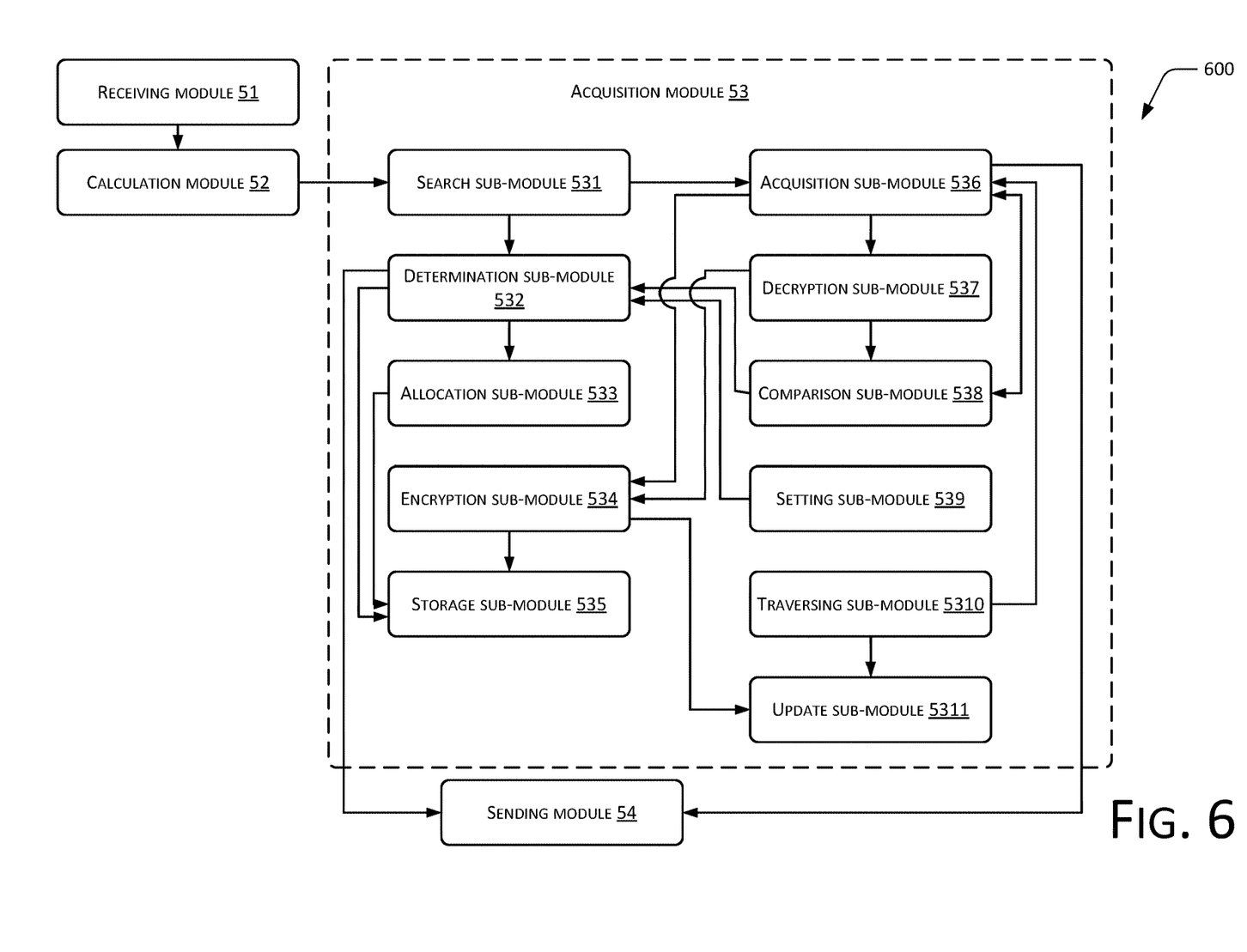
FIG. 6 is a structural schematic diagram of a service processing apparatus according to another embodiment of the present disclosure.

FIG. 6 is a structural schematic diagram of an apparatus 600 for processing a transaction according to another embodiment of the present disclosure. The apparatus 600 in this embodiment can implement the methods of the embodiments as shown in FIG. 2, FIG. 3, and FIG. 4. Compared with the apparatus 500 as shown in FIG. 5, in the apparatus 600 shown in FIG. 6, the acquisition module 53 may include: a search sub-module 531, a determination sub-module 532, an allocation sub-module 533, an encryption sub-module 534, and a storage sub-module 535.

The search sub-module 531 is used for searching in a database whether there is stored a card number record having the hash value.

The determination sub-module 532 is used for setting the original card number as a new card number when the search sub-module 531 does not find any card number record having the hash value.

The allocation sub-module 533 is used for setting a hash number corresponding to the original card number to be a first value, and allocating an index card number to the original card number, after the determination sub-module 532 determines the original card number as a new card number. In an embodiment, the first value may be set based on system performance and implementation requirements. The present embodiment does not impose any limitation on the size of the first value. For example, the first value may be 1.

The encryption sub-module 534 is used for acquiring a latest secret key and a version of the latest secret key from a secret key dictionary, encrypting the original card number by using the latest secret key, and combining a version of the latest secret key with a front end of a cipher text obtained from the encryption to obtain a cipher text corresponding to the original card number.

The storage sub-module 535 is for using the index card number allocated by the allocation sub-module 533, the cipher text corresponding to the original card number obtained by the encryption sub-module 534, the hash value corresponding to the original card number and the hash number corresponding to the hash value as a card number record corresponding to the original card number, and storing thereof in the database.

The determination sub-module 532 is further used for determining that the index card number is successfully allocated to the original card number, if there is no violation of a unique restriction on the hash value and the hash number when the storage sub-module 535 stores the card number record corresponding to the original card number in the database.

In an embodiment, the acquisition module 53 may further include: an acquisition sub-module 536, a decryption sub-module 537, and a comparison sub-module 538.

The acquisition sub-module 536 is used for: when the search sub-module 531 finds card number records having the hash value, acquiring a card number cipher text in each card number record that is found, intercepting a version of the secret key in the card number cipher text, reading the secret key dictionary based on the version of the secret key to obtain a secret key used for encrypting the card number cipher text.

The decryption sub-module 537 is used for decrypting the card number cipher text by using the secret key obtained by the acquisition sub-module 536 to obtain an original card number from each card number record.

The comparison sub-module 538 is used for comparing the original card numbers obtained by the decryption sub-module 537 with the received original card number one by one.

The acquisition sub-module 536 is further used for, when the comparison sub-module 538 determines that among the original card numbers obtained by the decryption sub-module 537, there exists a card number that is identical with the received original card number, acquiring an index card number corresponding to the received original card number from the card number record corresponding to the identical card number.

Furthermore, the acquisition module 53 may further include: a setting sub-module 539.

The determination sub-module 532 is further used for setting the received original card number as a new card number, when the comparison sub-module 538 determines that among the original card numbers obtained by the decryption sub-module 537, there exists no card number that is identical with the received original card number.

The setting sub-module 539 is used for setting a hash number corresponding to the original card number to be a second value, wherein the second value is a sum of a maximum value of the hash number of the card number record that is found and a preset value. Subsequently, the allocation sub-module 533, the encryption sub-module 534, and the storage sub-module 535 execute the process of obtaining an index card number.

In an embodiment, the preset value may be set based on system performance and implementation requirements. The present embodiment has no limitation on the size of the preset value. For example, the preset value may be 1.

In an embodiment, the transaction may be a card number data query. In this case, the sending module 54 is specifically used for sending the index card number obtained by the acquisition module 53 to an entity that processes a card number data query service to enable the entity to query the card number data corresponding to the index card number based on the index card number, and return the queried card number data.

Furthermore, the acquisition module 53 may include: a traversing sub-module 5310, an acquisition sub-module 536, a comparison sub-module 538, a decryption sub-module 537, an encryption sub-module 534, and an update sub-module 5311.

The traversing sub-module 5310 is used for traversing card number records stored in the database.

The acquisition sub-module 536 is used for acquiring a card number cipher text in a card number record currently traversed by the traversing sub-module 5310, and intercepting a version of a secret key in the card number cipher text.

The comparison sub-module 538 is used for comparing the version of the secret key obtained by the acquisition sub-module 536 with the latest version of the secret key obtained from the secret key dictionary.

The acquisition sub-module 536 is further used for: when the comparison sub-module 538 determines that the version of the secret key obtained by the acquisition sub-module 536 is not the latest version of the secret key, acquiring a secret key corresponding to the version of the secret key in the card number cipher text from the secret key dictionary, and acquiring a new secret key corresponding to the latest version of the secret key from the secret key dictionary after the decryption sub-module 537 obtains the original card number.

The decryption sub-module 537 is used for decrypting the card number cipher text by using the secret key obtained by the acquisition sub-module 536 to obtain the original card number.

The encryption sub-module 534 is used for encrypting the original card number obtained by the decryption sub-module 537 by using the new secret key obtained by the acquisition sub-module 536, and combining the cipher text obtained from the encryption with the latest version of the secret key to obtain an updated card number cipher text.

The update sub-module 5311 is used for updating the content in a field of the card number cipher text in the card number record currently traversed by the traversing sub-module 5310 to be the updated card number cipher text obtained by the encryption sub-module 534.

The above apparatus for processing a transaction creates corresponding index card numbers for a number of original card numbers in a system respectively, which ensures a one-to-one correspondence between the index card numbers and the original card numbers in the case of high concurrency and a convenient search for an encrypted credit card number whose password is changed frequently.

It should be noted that, in the description of the present disclosure, terms such as "first" and "second" are used only for description and cannot be construed as indicating or implying relative importance. In addition, in the description of the present disclosure, "a plurality of" means two or more, unless otherwise specified.

Any process or method described in the flow charts or described in any other way herein may be understood to include one or more modules, segments or parts for executable instruction codes that realize particular logic functions or process steps. Moreover, exemplary embodiments of the present disclosure include other implementations, in which the function may be performed in an order different from what is depicted or discussed, including a substantially simultaneous manner or a reverse order based on the related functions. This should be understood by those skilled in the art to which embodiments of the present disclosure belong.

It should be understood that each part of the present disclosure may be realized by the hardware, software, firmware or their combination. In the above embodiments, a plurality of steps or methods may be implemented by using the software or firmware stored in the memory and executed by using the appropriate instruction execution system. For example, if it is implemented by using the hardware, likewise in another embodiment, the steps or methods may be implemented by using one or a combination of the following techniques known in the art: a discreet logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or part of the steps in the above methods may be achieved by instructing the related hardware with programs. The programs may be stored in a computer readable storage medium, and the programs, when run, include one or a combination of the steps in the method embodiments.

In addition, each function module of the embodiments of the present disclosure may be integrated in a single processing module, or these modules may be separate physical existence, or two or more modules are integrated in a single processing module. The integrated module may be realized in a form of hardware or in a form of software function module. When the integrated module is realized in a form of software function module and is sold or used as a standalone product, the integrated module may be stored in a computer readable storage medium.

The storage medium mentioned above may be read-only memories, magnetic disks, CD, etc.

Figure 7:
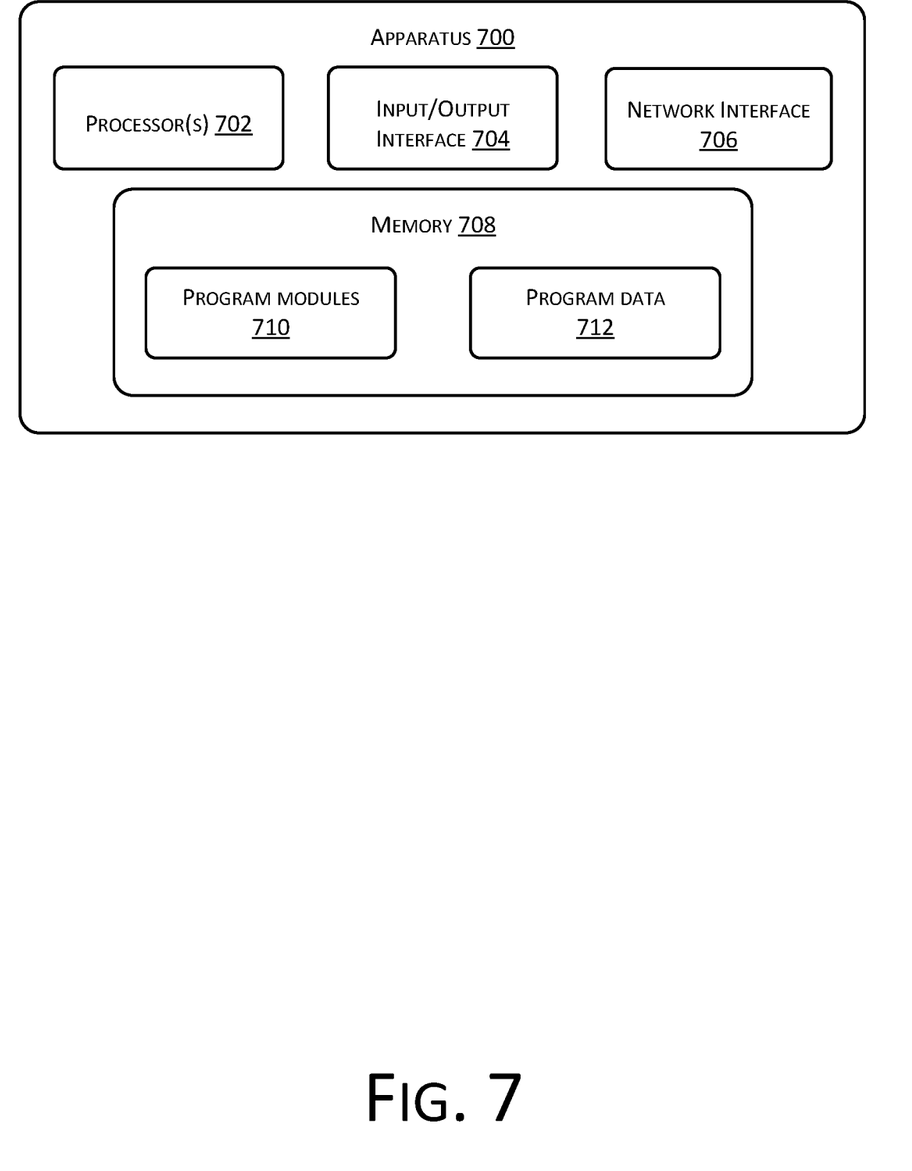
FIG. 7 is a structural schematic diagram of the apparatus as described in FIGS. 5 and 6 in more detail.

In an embodiment, the present disclosure provides a computing device including one or more processors (CPU), input/output interfaces, network interfaces and memory. By way of example and not limitation, FIG. 7 shows an example apparatus 700, such as the apparatuses 500 and 600, as described in FIGS. 5 and 6 in further detail. In implementations, the apparatus 700 may include, but is not limited to, one or more processors 702, an input/output (I/O) interface 704, a network interface 706 and memory 708.

The memory 708 may include a form of computer readable media, e.g., a non-permanent storage device, random access memory (RAM) and/or a nonvolatile storage, e.g., read-only memory (ROM) or flash memory (flash RAM). The memory 708 can be regarded as an example of computer readable media.

The computer readable media includes permanent and non-permanent as well as removable and non-removable media capable of accomplishing a purpose of information storage by any method or technique. The information may be referred to a computer readable instruction, a data structure, a program module or other data. Examples of computer storage media include, but are not limited to: a phase-change memory (PRAM), a static random-access memory (SRAM), a dynamic random access memory (DRAM), other types of random access memory (RAM), a read-only memory (ROM), an electrically-erasable programmable read-only memory (EEPROM), a flash memory or other memory technologies, a compact disc read-only memory (CD-ROM), a digital versatile disk (DVD) or other optical storage media, a cassette tape, a diskette or other magnetic storage device, or any other non-transmission medium which can be used to store information that is accessible by a computing device. As defined herein, the computer readable media does not include transitory media such as a modulated data signal and a carrier wave.

The memory 708 may include program modules 710 and program data 712. The program modules 710 may include one or more of the foregoing modules and/or sub-modules of the apparatus 500 and/or the apparatus 600 as described in the foregoing embodiments. Details of these modules can be found in the foregoing description and are therefore not redundantly described herein.

Reference throughout this specification to "an embodiment," "some embodiments," "an example," "a specific example," or "some examples," means that a specific feature, structure, material, or characteristic described in connection with such embodiment or example is included in at least one embodiment or example of the present disclosure. The expression of these terms throughout this specification are not necessarily referring to a same embodiment or example. Furthermore, the specific features, structures, materials, or characteristics may be combined in any suitable manner in one or more embodiments or examples.

Although the embodiments of the present disclosure have been shown and described in the above, it would be appreciated that the above embodiments are exemplary and cannot be construed as limiting the present disclosure, and those skilled in the art can make changes, modifications, replacements and alternations in the embodiments within the scope of the present disclosure.

What is claimed is:

1. A method implemented by one or more computing devices for ensuring one-to-one correspondence between an index card number and an original card number, the method comprising:
receiving the original card number for a request of processing a transaction;
calculating a hash value corresponding to the original card number;
determining whether a card number record having the hash value is stored in a database among a plurality of card number records stored in the database, each card number record comprising a corresponding index card number, a corresponding card number cipher text, and a corresponding hash value; and
upon determining that the card number record having the hash value is stored in the database:
obtaining a card number cipher text from the card number record;
extracting a version of a secret key in the card number cipher text;
obtaining a secret key used for encrypting the card number cipher text by reading a secret key dictionary based on the version of the secret key;
obtaining a stored card number associated with the card number record by decrypting the card number cipher text using the secret key;
determining whether the original card number is identical to the stored card number; and
upon determining that the original card number is identical to the stored card number:
obtaining an index card number corresponding to the original card number based on the hash value corresponding to the original card number; and
sending the index card number to an entity to process the transaction based on the index card number.

2. The method of claim 1 further comprising:
upon determining that the card number record having the hash value is not stored in the database,
setting the original card number as a new card number;
setting a hash number corresponding to the original card number to be a first value, allocating an index card number to the original card number;
obtaining a latest secret key and a version of the latest secret key from a secret key dictionary;
encrypting the original card number using the latest secret key, and combining the version of the latest secret key with a front end of a cipher text obtained from the encryption to obtain a cipher text corresponding to the original card number; and
using the allocated index card number, the cipher text corresponding to the original card number, the hash value corresponding to the original card number, and the hash number corresponding to the hash value as a card number record corresponding to the original card number, and storing the card number record in the database, wherein the index card number is determined to be successfully allocated to the original card number if no violation of a restriction on the hash value and the hash number exists when storing the card number record corresponding to the original card number in the database.

3. The method of claim 1, further comprising:
traversing the plurality of card number records stored in the database;
obtaining a card number cipher text from a currently traversed card number record and extracting a secret key version from the card number cipher text;
comparing the secret key version of the card number cipher text with a latest secret key version obtained from the secret key dictionary;
obtaining a secret key corresponding to the secret key version of the card number cipher text from the secret key dictionary and using the obtained secret key to decrypt the card number cipher text to obtain the original card number if the secret key version of the card number cipher text is not the latest secret key version;
obtaining a new secret key corresponding to the latest secret key version from the secret key dictionary, encrypting the original card number using the new secret key, and combining a cipher text obtained from the encryption with the latest secret key version to obtain an updated card number cipher text; and
updating a content in a field of the card number cipher text in the currently traversed card number record as an updated card number cipher text.

4. The method of claim 1, further comprising:
upon determining that the original card number is not identical to the stored card number:
setting the original card number as a new card number;
setting a hash number corresponding to the stored card number to be a second value;
allocating an index card number to the stored card number;
obtaining a latest secret key and a version of the latest secret key from a secret key dictionary;
encrypting the original card number using the latest secret key;
combining the version of the latest secret key with a front end of a cipher text obtained from the encryption to obtain a cipher text corresponding to the original card number;
using the allocated index card number, the cipher text corresponding to the original card number, the hash value corresponding to the original card number and the hash number corresponding to the hash value as a card number record corresponding to the original card number; and
storing the card number record in the database, wherein the index card number is determined to be successfully allocated to the original card number if no violation of a restriction on the hash value and the hash number exists when storing the card number record corresponding to the original card number in the database.

5. An apparatus comprising:
one or more processors; and
memory coupled to the one or more processors, the memory storing a plurality of modules executable by the one or more processors, the plurality of modules including:
a receiving module configured to receive an original card number used for requesting to process a transaction;
a calculation module configured to calculate a hash value corresponding to the original card number received by the receiving module;
an acquisition module configured to obtain an index card number corresponding to the original card number based on the hash value corresponding to the original card number, the acquisition module comprising:
a search sub-module configured to search a database for a stored card number record having the hash value;

an acquisition sub-module configured to obtain a respective card number cipher text in each card number record that is found by the search sub-module, intercept a secret key version from the respective card number cipher text, read a secret key dictionary based on the secret key version, obtain a secret key used for encrypting the respective card number cipher text from the secret key dictionary, a decryption sub-module configured to decrypt the respective card number cipher text using the secret key that is obtained by the acquisition sub-module to obtain a respective original card number from each card number record;

a comparison sub-module configured to compare the respective original card number of each card number record that is obtained by the decryption sub-module with the received original card number; and a determination sub-module configured to set the original card number as a new card number when no card number record having the hash value is found in the database; and a sending module configured to send the index card number obtained by the acquisition module to an entity that processes the transaction to enable the entity to process the transaction based on the index card number.

6. The apparatus of claim 5, wherein the acquisition module further comprises:

an allocation sub-module configured to set a hash number corresponding to the original card number to be a first value and allocating an index card number to the original card number, after the determination sub-module sets the original card number as the new card number;

an encryption sub-module configured to obtain a latest secret key and a version of the latest secret key from a secret key dictionary, encrypt the original card number using the latest secret key, and combine the version of the latest secret key with a front end of a cipher text obtained from the encryption to obtain a cipher text corresponding to the original card number; and a storage sub-module configured to use the index card number allocated by the allocation sub-module, the cipher text corresponding to the original card number obtained by the encryption sub-module, the hash value corresponding to the original card number and the hash number corresponding to the hash value as a card number record corresponding to the original card number, and store the card number record in the database.

7. The apparatus of claim 6, wherein the determination sub-module is further configured to determine that the index card number is successfully allocated to the original card number when no violation of a restriction on the hash value and the hash number exists when the storage sub-module stores the card number record corresponding to the original card number in the database.

8. The apparatus of claim 5, wherein the acquisition sub-module is further configured to obtain an index card number corresponding to the received original card number from a card number record having a corresponding card number that is identical to the received original card number.

9. The apparatus of claim 5, wherein the acquisition module further comprises a setting sub-module, the setting sub-module configured to set a hash number corresponding to the original card number to be a second value upon the comparison sub-module determining that no card number record having a card number that is identical to the received original card number exists in the database and the determination sub-module setting the received original card number as a new card number.

10. One or more memories storing executable instructions that, when executed by one or more processors, cause the one or more processors to perform acts for ensuring one-to-one correspondence between an index card number and an original card number, the acts comprising:

receiving the original card number for a request of processing a transaction;

calculating a hash value corresponding to the original card number;

determining whether a card number record having the hash value is stored in a database among a plurality of card number records stored in the database, each card number record comprising a corresponding index card number, a corresponding card number cipher text, and a corresponding hash value; and upon determining that the card number record having the hash value is stored in the database:

obtaining a card number cipher text from the card number record;

extracting a version of a secret key in the card number cipher text;

obtaining a secret key used for encrypting the card number cipher text by reading a secret key dictionary based on the version of the secret key;

obtaining a stored card number associated with the card number record by decrypting the card number cipher text using the secret key; and determining whether the stored card number is identical to the original card number;

upon determining that the stored card number is identical to the original card number:

obtaining an index card number corresponding to the original card number based on the hash value corresponding to the original card number; and sending the index card number to an entity to process the transaction based on the index card number.

11. The one or more memories of claim 10, wherein, upon determining that the card number record having the hash value is not stored in the database, the acts further comprise:

setting the original card number as a new card number;

setting a hash number corresponding to the original card number to be a first value, allocating an index card number to the original card number;

obtaining a latest secret key and a version of the latest secret key from a secret key dictionary;

encrypting the original card number using the latest secret key, and combining the version of the latest secret key with a front end of a cipher text obtained from the encryption to obtain a cipher text corresponding to the original card number; and using the allocated index card number, the cipher text corresponding to the original card number, the hash value corresponding to the original card number and the hash number corresponding to the hash value as a card number record corresponding to the original card number, and storing the card number record in the database, wherein the index card number is determined to be successfully allocated to the original card number if no violation of a restriction on the hash value and the hash number exists when storing the card number record corresponding to the original card number in the database.

12. The one or more memories of claim 10, wherein the acts further comprise:
- determining whether the stored card number is identical to the original card number; and
- upon determining that the stored card number is identical with the original card number, obtaining an index card number corresponding to the original card number from the card number record.

13. The one or more memories of claim 12, wherein, upon determining that the stored card number is not identical to the original card number, the acts further comprise:
- setting the original card number as a new card number;
- setting a hash number corresponding to the stored card number to be a second value;
- allocating an index card number to the original card number;
- obtaining a latest secret key and a version of the latest secret key from a secret key dictionary;
- encrypting the original card number using the latest secret key;
- combining the version of the latest secret key with a front end of a cipher text obtained from the encryption to obtain a cipher text corresponding to the original card number;
- using the allocated index card number, the cipher text corresponding to the original card number, the hash value corresponding to the original card number and the hash number corresponding to the hash value as a card number record corresponding to the original card number; and
- storing the card number record in the database, wherein the index card number is determined to be successfully allocated to the original card number if no violation of a restriction on the hash value and the hash number exists when storing the card number record corresponding to the original card number in the database.

14. The one or more memories of claim 10, wherein the acts further comprise:
- traversing the plurality of card number records stored in the database;
- obtaining a card number cipher text from a currently traversed card number record and extracting a secret key version from the card number cipher text;
- comparing the secret key version of the card number cipher text with a latest secret key version obtained from the secret key dictionary;
- obtaining a secret key corresponding to the secret key version of the card number cipher text from the secret key dictionary and using the obtained secret key to decrypt the card number cipher text to obtain the original card number if the secret key version of the card number cipher text is not the latest secret key version;
- obtaining a new secret key corresponding to the latest secret key version from the secret key dictionary, encrypting the original card number using the new secret key, and combining a cipher text obtained from the encryption with the latest secret key version to obtain an updated card number cipher text; and
- updating a content in a field of the card number cipher text in the currently traversed card number record as an updated card number cipher text.

\* \* \* \* \*